Figure 1:
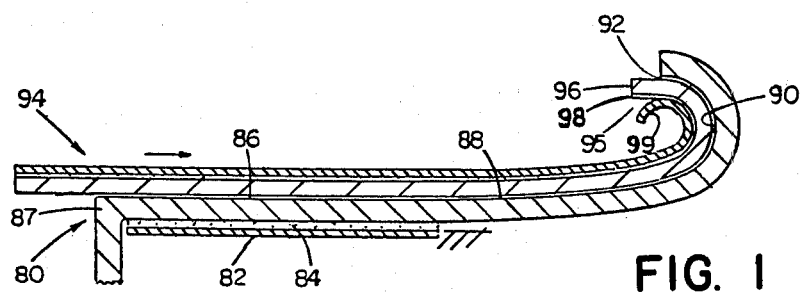

United States Patent [19]

Gehweiler

[11] 4,216,048
[45] Aug. 5, 1980

[54] SEPARATING LAMINATED LAYERS
[75] Inventor: Edward C. Gehweiler, Milwaukee, Wis.
[73] Assignee: W. H. Brady Co., Milwaukee, Wis.
[21] Appl. No.: 851,880
[22] Filed: Nov. 16, 1977
[51] Int. Cl.² ............... B32B 35/00; B32B 07/12
[52] U.S. Cl. ............................. 156/344; 156/584
[58] Field of Search ......... 156/584, 344, 443, 247, 156/249; 271/172; 221/70–74

[56] References Cited
U.S. PATENT DOCUMENTS

| | | | |
|---|---|---|---|
| 2,422,998 | 6/1947 | Adams et al. | 428/186 X |
| 2,754,994 | 7/1956 | Cole | 156/584 X |
| 3,107,814 | 10/1963 | Auger et al. | 221/73 |
| 3,266,797 | 8/1966 | Stievenart | 156/584 X |

Primary Examiner—John T. Goolkasian
Assistant Examiner—Thomas Bokan

[57] ABSTRACT

Laminate layers, such as a label and its liner, are separated by directing both layers at an end of the laminate around a sharp bend to cause shearing and lengthwise offset between the layers, and then releasing the end, the overall orientation being such that, upon release of the end, a differential in the forces that tend to straighten the layers drives apart the shear-weakened adhesive bond. The bending is carried out by sliding the end around a sharply curved surface.

3 Claims, 3 Drawing Figures

SEPARATING LAMINATED LAYERS

FIELD OF THE INVENTION

This invention relates to separating element layers from other layers to which they are adhered; e.g., to removing labels from liners.

BACKGROUND OF THE INVENTION

It is well known in the art to remove labels adhered with pressure-sensitive adhesive to a continuous liner by directing the liner around a sharp bend so that the stiffness of the label in tending to resist bending imposes forces in tension causing at least partial separation of the label leading edge; e.g., Cole U.S. Pat. No. 2,754,994. Employing this principle necessitates maintaining guide control of a portion of the liner downstream (i.e., in advance) of the leading edge of the label.

In two United States patent applications recently filed by Frederic S. Tobey, each entitled Separating Laminated Layers and hereby incorporated herein by reference, there is disclosed Tobey's discovery that leading edges of discrete elements such as label layers may be removed from liner layers to which they are adhered by directng both layers at an end of an element-liner laminate around a sharp bend to cause shearing and lengthwise offset between the layers, and then releasing the end, the overall orientation being such that, upon release of the end, a differential in the forces that tend to straighten the layers drives apart the shear-weakened adhesive bond.

SUMMARY OF THE INVENTION

I have discovered that Tobey's method may be practiced by using a very simple and inexpensive device to curl the end of the laminate, thereby producing the bend to shear and separate the layers.

In a preferred embodiment a unitary element has an initial flat surface followed in turn by a gently curving surface and a sharply curving surface.

In another preferred embodiment an adjustable stop is provided to limit the depth of insertion of a corner of the laminate into the curling element.

PREFERRED EMBODIMENTS

I turn now to presently-preferred embodiments of the invention.

DRAWINGS

Figure 2:
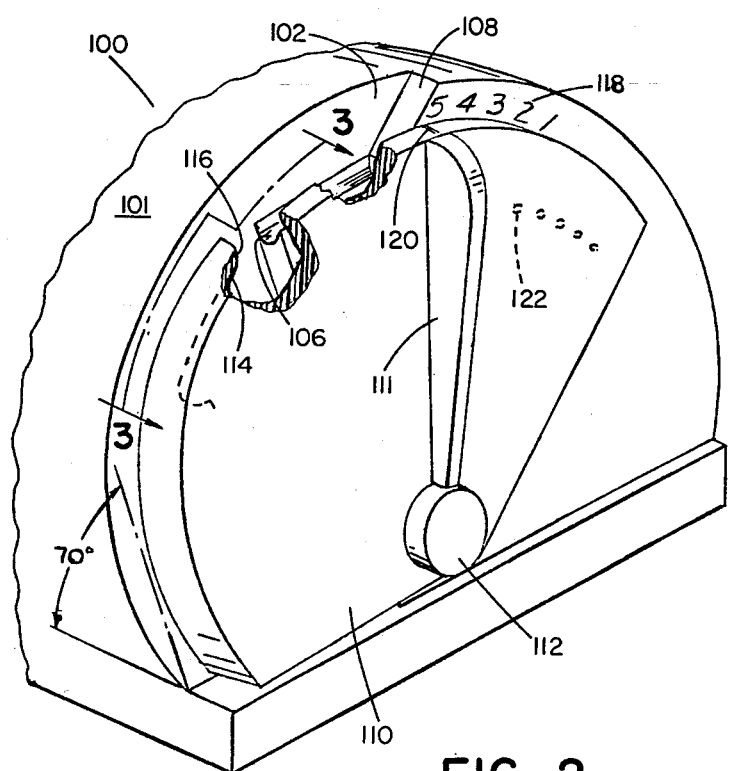
Figure 3:
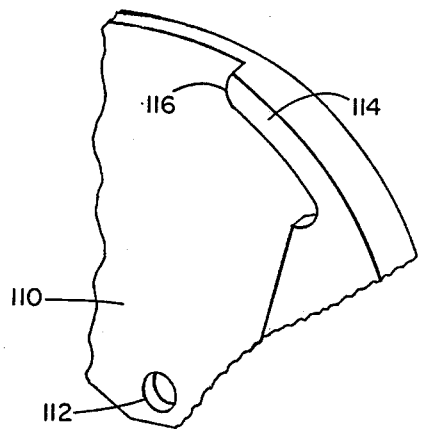

There is shown in:

FIG. 1 a vertical sectional view, broken away at one end, of one preferred embodiment of the invention;

FIG. 2 an isometric view partly broken away of a second preferred embodiment; and FIG. 3 a fragmentary view taken along 3—3 of FIG. 2.

DESCRIPTION

The embodiments described in the drawings and their operation are now described.

1. Embodiments

Referring to FIG. 1, a unitary curling element indicated generally at 80 and formed of sheet metal (with a lower liner portion 82 and adhesive layer 84 to provide for adherence to a workbench if desired) has an initial flat portion 86, followed by a gently curving portion 88, and a sharply curving portion 90. Curved portion 90 should extend all the way to a vertical line through the center of curvature of portion 90 for optimum effect, and yet should not continue to curve beyond that vertical line, to avoid jamming or buckling the laminate. Manufacturing tolerances are thus controlled so that any error in portion 90 is on the short side, and a short (0.015 inches) straight portion 92 is added following portion 90. Extending downwardly (but not shown) from end 87 of portion 86 is another flat portion, followed by a sharply curved portion (curving to the left and then up) of the same radius as portion 90, in turn followed by a straight portion corresponding to portion 92.

In the embodiment of FIGS. 2 and 3, curling element 100, suitable for use while resting on a table top, has a body 101 providing a flat surface 102 sloping downwardly, at an angle of 70° to the horizontal, toward surface 106 which curves uniformly through 180° about a horizontal center-line. At one side of curved surface 106 is a fixed, planar stop surface 108, at 45° to the vertical. Plate 110 (with a grip 111), pivoted to body 101 at 112, has its inner surface relieved to provide along its upper edge a curved ridge 114 (best seen in FIG. 3) with a rounded stop surface 116 facing planar stop surface 108. Graduations 118 and mark 120 are provided on body 101 and plate 110, respectively. Dimples 122 on the inside surface of plate 110 are opposite a spring-loaded detent (not shown) on body 101.

2. Operation

In operation of the FIG. 1 embodiment, a nameplate unit indicated generally at 94, and including a lower polyester (Mylar) nameplate layer 96, an adhesive layer 98, and a liner layer 99, is introduced, corner first, onto the flat portion 86, and held down against it while being pushed and guided along gently curved (to avoid buckling the nameplate) portion 88 and then around sharply curved portion 90. Layers are compressed together during movement through this sharp portion by the resistance to bending of the nameplate layer 96. When the laminate moves beyond portion 90, the liner tends to keep its new set, while the nameplate, with a greater memory, separates, as shown generally at 95. The unshown portion extending downwardly from end 87 is useful in the same way for very short nameplates.

In the embodiment of FIGS. 2 and 3, plate 110 is angularly adjusted to set the distance between stop surfaces 116 and 108, depending upon whether the nameplate to be inserted has a sharp or rounded corner. The rounder the nameplate corner, the farther apart should be the stop surfaces, so that the nameplate will slide all the way around the curved curling surface 106. Dimples 122 cooperate with the detent to hold plate 110 in its set position during operation. The nameplate is inserted vertically, corner first, so that its corner strikes the sloping surface 102 upstream of curved surface 106. The corner is thus gently bent before reaching surface 106. The nameplate is then pressed against surface 102 and moved downwardly, causing the corner to slide around surface 106 until the nameplate edges forming that corner strike stop surfaces 108 and 116. Separation of the nameplate layers is as in FIG. 1.

I claim:

1. A method of separating coterminous layers of a laminate at an end thereof, said layers comprising a flexible layer and a liner with an adhesive bond therebetween, said method comprising sliding said end around a sharply curved concave surface to bend both said layers sharply in the same direction at said end to cause shearing and lengthwise offset therebetween to weaken said bond, all of said sliding being end-first in the direction away from said laminate along said concave surface, said bending being carried out by forces applied to one said layer by its sliding contact with said concave surface and without direct guiding of the other said layer at said end, and then, without allowing said bond to re-form, releasing said end to permit both said layers to spring back from said bending, the overall orientation being such that, upon release of said end, a differential in the forces that tend to straighten the layers drives apart the shear-weakened adhesive bond.

2. A method as claimed in claim 1 wherein said sliding step comprises sliding said end corner first.

3. A method of separating layers of a laminate as claimed in claim 1, comprising advancing said laminate corner first against a flat surface and at an angle thereto to cause said flat surface to initiate said bending, and then advancing said laminate along said curved surface to complete said bending.

* * * * *